United States Patent
Bjerrum-Niese

(10) Patent No.: US 7,574,239 B2
(45) Date of Patent: Aug. 11, 2009

(54) HANDSFREE CAR MOUNTING KIT

(75) Inventor: Christian Bjerrum-Niese, København (DK)

(73) Assignee: GN Netcom A/S, Ballerup (DK)

( * ) Notice: Subject to any disclaimer, the term of this patent is extended or adjusted under 35 U.S.C. 154(b) by 205 days.

(21) Appl. No.: 10/572,491

(22) PCT Filed: Sep. 16, 2004

(86) PCT No.: PCT/DK2004/000618

§ 371 (c)(1), (2), (4) Date: Nov. 17, 2006

(87) PCT Pub. No.: WO2005/029825

PCT Pub. Date: Mar. 31, 2005

(65) Prior Publication Data

US 2007/0167185 A1    Jul. 19, 2007

(30) Foreign Application Priority Data

Sep. 19, 2003    (DK)    ............................... 2003 01368

(51) Int. Cl.
*H04M 1/00* (2006.01)
(52) U.S. Cl. .................................. 455/569.1; 455/569.2
(58) Field of Classification Search ................ 455/41.2, 455/569.1, 569.2
See application file for complete search history.

(56) References Cited

U.S. PATENT DOCUMENTS

| 6,230,029 B1 | 5/2001 | Hahn et al. |
| 2002/0072390 A1* | 6/2002 | Uchiyama .................... 455/557 |

FOREIGN PATENT DOCUMENTS

| EP | 1326410 A | 7/2003 |
| GB | 2277422 A | 10/1994 |

* cited by examiner

*Primary Examiner*—Alexander Jamal
(74) *Attorney, Agent, or Firm*—Altera Law Group, LLC

(57) ABSTRACT

A handsfree car mounting kit for a mobile telephone (6) coupled to a head-set (4) via a Bluetooth radio module consists of a passive communications unit (1), which has a loudspeaker and a microphone (5), optionally coupled to an amplifier, arranged in a cabinet which has a bearing or a holder on its outer side in which the headset (4) may be placed and connected electrically to the communications unit. Further, the cabinet is provided with a plug terminal for a 12 volts socket terminal (3), such as a cigarette lighter in a car. The headset (4), which has a digital signal processor (7) containing inter alia a Bluetooth radio module an optionally a noise reducing circuit, is coupled to the bearing or the holder in the communications unit such that it can detect the voltage applied to the communications unit, and by means of a switching circuit (11) it is possible to adapt the digital signal processor of the headset and the control knobs of the headset to function with the loud-speaker (2) and the microphone (5) of the communications unit. Hereby, a handsfree car mounting kit of a simple structure is provided, just using a few and simple components, and all the vital parts from the headset (4) may be switched to cooperate with the loudspeaker (2) and the micro-phone (5) of the communications unit.

7 Claims, 1 Drawing Sheet

HANDSFREE CAR MOUNTING KIT

Figure 1:
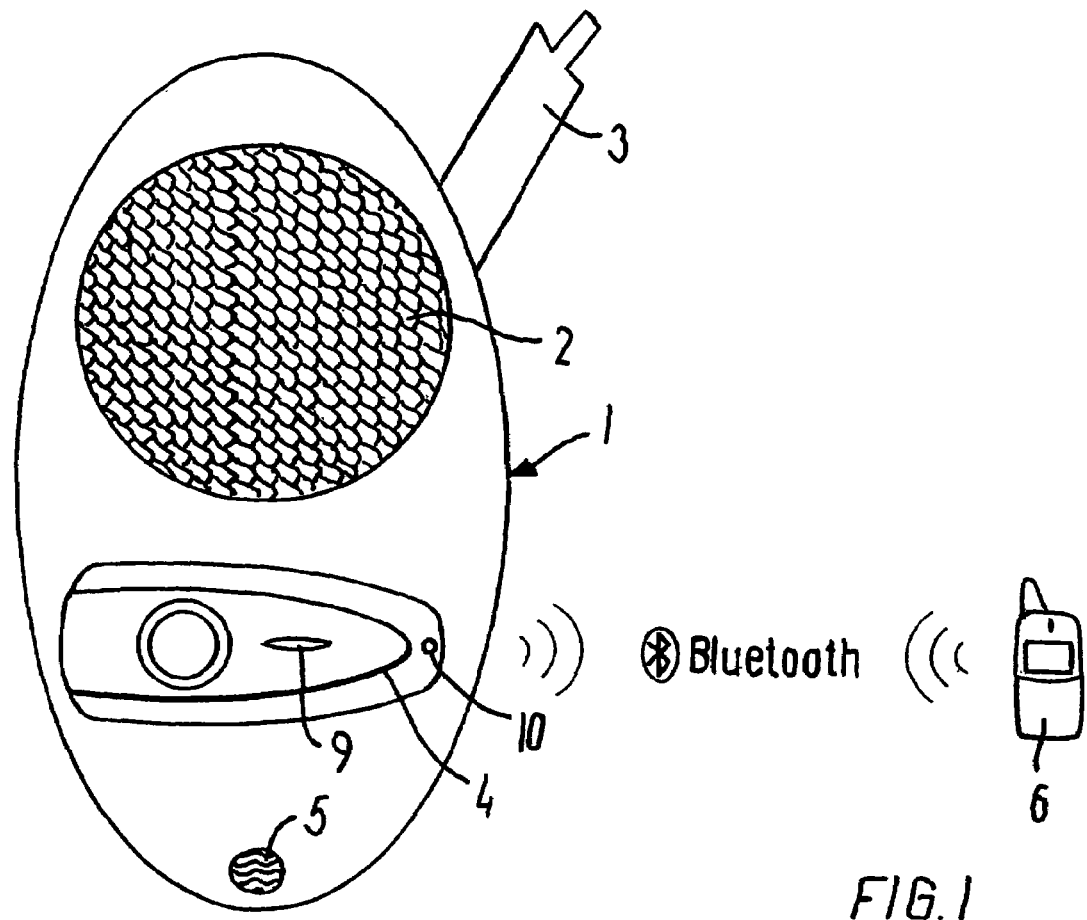

The invention relates to a handsfree car mounting kit for a mobile telephone, said mobile telephone being coupled to a headset via a short range communications link, such as of the Bluetooth type, said mounting kit comprising a communications unit in a cabinet connected to a power supply, such as a 12 volts socket terminal in a vehicle, said cabinet having a bearing or a holder in which the headset may be placed and coupled to the communications unit, said cabinet containing a loudspeaker and a microphone.

A similar car mounting kit is known from the company "FreeTop". This known car mounting kit consists of a communications unit having an independent Bluetooth radio module, it being possible to mount a headset in the communications unit such that it may be charged via a 12 volts socket terminal of a car. When the headset is arranged in the bearing, it is switched off, and the communications unit takes over the function of the headset.

Thus, it is a system where the headset and the communications unit are two separate units, each having its own Bluetooth radio module, which operate independently of each other, but such that, as mentioned, the headset is switched off when it is arranged in the bearing of the communications unit.

It should be noted that a user carrying a headset on his ear operates the mobile telephone as a handsfree set when driving a car, of course, but over long distances there is hardly any doubt that it may be a strain to carry a headset on the ear for an extended period of time, also even though headsets today are manufactured in lightweight versions.

A handsfree car mounting kit as defined in the introductory portion of claim 1 is known from GB 2 277 422 A.

Now, an object of the invention is to provide a handsfree car mounting kit including a headset which has a less complicated structure with passive components, while maintaining the same comfort as the handsfree kit mentioned above and defined in the introductory portion of claim 1.

The object of the invention is achieved by a handsfree car mounting kit of the type defined in the introductory portion of claim 1, which is characterized in that an electrical connection to the headset is provided in the bearing or the holder, allowing the communications unit to be coupled to the electrical circuit of the headset.

Hereby, the communications unit may be composed of passive components which may be controlled from the electrical circuits incorporated in the headset. However, it should be noted in this connection that nothing prevents the loudspeaker signal from being amplified by means of an incorporated amplifier.

The coupling of the communications unit may advantageously be made as stated in claim 2 in that the headset accommodates a switching circuit adapted to switch the electrical circuit for connection to the loudspeaker and the optional microphone of the communications unit when the headset is placed in the bearing, or for connection to the microphone and loudspeaker of the headset when the headset is removed from the bearing.

As stated in claim 3, the electrical circuit of the headset is a digital signal processor having a Bluetooth radio module which optionally contains a noise reducing circuit, which ensures an optimum sound quality between the mobile telephone and the communications unit.

Further expedient embodiments of the invention are defined in claims 5 and 6.

Figure 2:
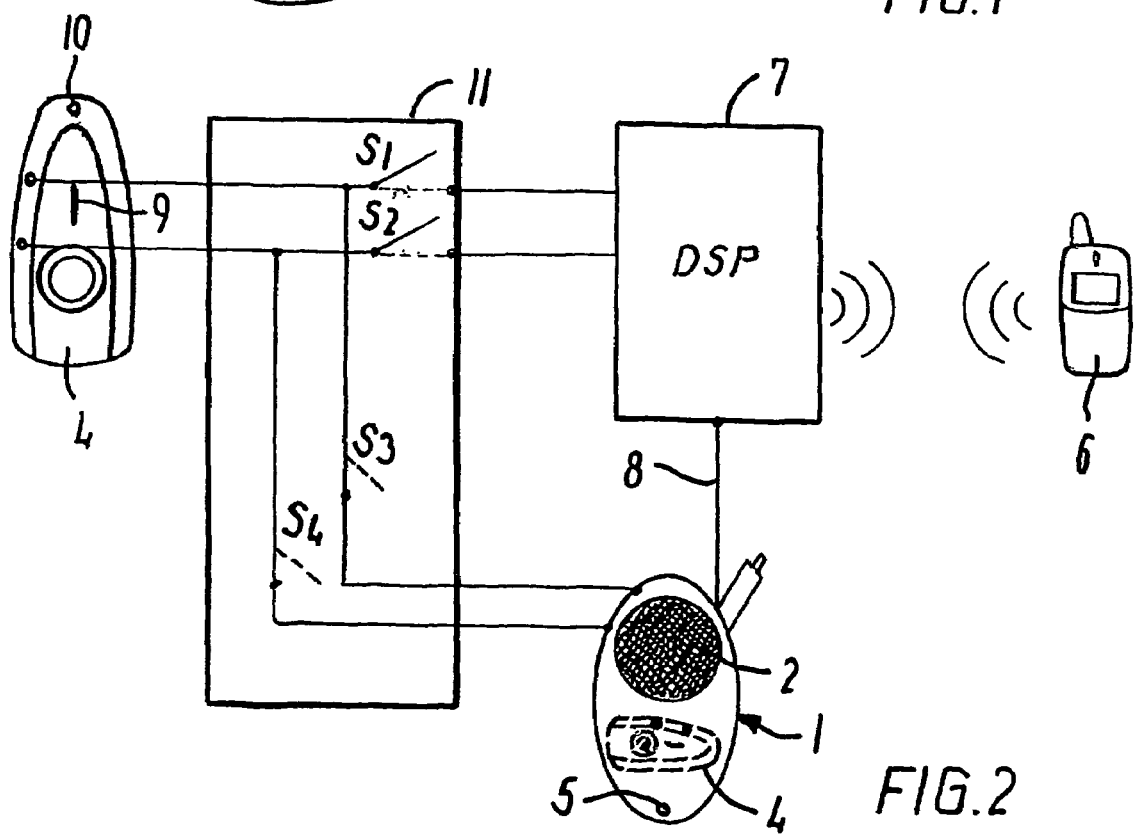

The invention will now be explained more fully with reference to the drawing, in which FIG. 1 shows the units incorporated according to the invention, while FIG. 2 illustrates in block diagram form how the units of FIG. 1 cooperate.

In FIG. 1, the numeral 1 designates a communications unit according to the invention. It consists of a cabinet in which a loudspeaker 2 and a microphone 5 are incorporated. Further, the communications unit is equipped with a plug 3, which is expediently a 12 volts plug for the cigarette lighter of a car.

The cabinet may optionally accommodate an amplifier (not shown) for amplifying the loudspeaker signal.

As will additionally be seen in FIG. 1, a headset 4 is arranged in a bearing in the cabinet, said headset being equipped with a microphone 10 and a loudspeaker 9 as well as an electrical circuit, as is well-known.

Further, the bearing includes electrical connections to the headset in the form of two wires for the transfer of signals received from the headset to the loudspeaker of the communications unit, and, if the communications unit is provided with a microphone, two wires for the transfer of transmitted signals from the communications unit to the headset. In addition, the bearing includes two wires for the charging of the headset.

Finally, FIG. 1 shows a mobile telephone 6 capable of communicating with the headset 4 via a short range communications link of the Bluetooth type.

It will now be explained in connection with FIG. 2 how the units in FIG. 1 cooperate.

For the sake of clarity, the electrical circuits included in the headset in the form of a digital signal processor 7 comprising a Bluetooth radio module, are shown outside the headset.

At the moment when a headset is placed in the bearing or the holder, the digital processor detects on a wire 8 that the headset has been connected to the communications unit 1. The digital signal processor now affects a switching circuit 11, which may also be incorporated in the headset, in such a manner that the loudspeaker 2 and the optional microphone 5 of the communications unit are coupled to the headset, while the loudspeaker 9 and optionally the microphone 10 of the headset are switched off.

As will be seen in FIG. 2, the switching circuit has two pairs of switches which are designated S1, S2 and S3, S4. With the switches in the position shown in FIG. 2, the communications unit is coupled to the electrical circuit of the headset, said switches S1, S2 being open and said switches S3, S4 being closed, and thereby coupled to the mobile telephone 6 via the Bluetooth radio module of the headset.

If the headset is removed from the communications unit, the switches S1 and S2 will close (shown schematically in dashed line), while the switches S3 and S4 will open (shown schematically in dashed line), whereby the headset will operate as an ordinary headset.

The invention claimed is:

1. A handsfree car mounting kit for a mobile telephone said mobile telephone being coupled to a headset via a short range communications link, said headset including an electrical circuit specifically configured to switch its speaker output from internal to external, said mounting kit comprising a communications unit in a cabinet connected to a power supply, said cabinet having a bearing in which the headset may be placed and coupled to the communications unit, said cabinet containing a loudspeaker and a microphone, wherein an electrical connection to the headset is provided in the bearing, wherein the communications unit accommodates passive components that are directly responsive to said electrical circuit in the headset thereby causing said passive components in said bearing to receive the speaker output of said headset, when the headset is placed in the bearing.

2. A handsfree car mounting kit according to claim 1, wherein the electric circuit is a switching circuit adapted to re-direct the speaker output and the microphone input of the headset from the headset to the communications unit when the headset is placed in the bearing, or for re-connection to the microphone and speaker of the headset when the headset is removed from the bearing.

3. A handsfree car mounting kit according to claim 1, wherein the electrical circuit of the headset is a digital signal processor (7) having a Bluetooth radio module which contains a noise reducing circuit.

4. A handsfree car mounting kit according to claim 1, wherein the noise reducing circuit comprises an echo attenuating circuit which, when the headset is placed in the bearing, is adapted to be coupled to the communications unit.

5. A handsfree car mounting kit according to claim 1, wherein the headset has a plurality of control knobs, whose functions, when the headset is placed in the bearing of the communications unit, control the communications unit.

6. A handsfree car mounting kit according to claim 1, wherein the digital signal processor detects via an electrical connection in the bearing whether the headset is placed in it, and, if so, the digital signal processor adapts its properties to the characteristics of the communications unit.

7. A handsfree car mounting kit for a mobile telephone said mobile telephone being coupled to a headset via a short range communications link, said headset including an electrical circuit and a digital signal processor specifically configured to switch its inputs and outputs from internal to external and detect the operational characteristics of an external device receiving such inputs and outputs, said mounting kit comprising a communications unit in a cabinet connected to a power supply, said cabinet having a bearing in which the headset may be placed and coupled to the communications unit, said cabinet containing a speaker and a microphone, wherein an electrical connection to the headset is provided in the bearing, wherein the communications unit accommodates components which are entirely passive and without amplification, but are directly responsive to said electrical circuit in the headset thereby causing said passive components in said bearing to receive the speaker output of said headset, and wherein the digital signal processor adapts its properties to the passive characteristics of the communications unit when the headset is placed in the bearing, so that the amplitude of the inputs and outputs is matched to communications units of varying characteristics.

\* \* \* \* \*